2,920,052

Patented Jan. 5, 1960

2,920,052

SILVER CATALYST AND METHOD OF MANUFACTURE

George R. Martin, Freeport, Tex., assignor to The Dow Chemical Company, Midland, Mich., a corporation of Delaware No Drawing. Application September 21, 1956
Serial No. 611,341

6 Claims. (Cl. 252—463)

This invention concerns silver catalysts and their method of preparation. More particularly it concerns supported silver catalysts and their method of preparation wherein the silver is filmly retained by the support as a consequence of a novel in situ reduction process involving a polyhydric alcohol compound which functions both as a reductant and as an adhesion promoting agent.

Silver catalysts are well-known. In supported form, they are the principal catalysts of choice for oxidizing ethylene to ethylene oxide.

One of the difficulties incidental to their use is the relatively poor adhesion of the molecular silver to the support or substrate. Because the silver flakes or powders off in handling or in use, supported silver catalysts more or less rapidly decrease in catalytic activity. Furthermore, packing of such silver fines promotes channeling or plugging in the reactor, with consequent reduction in conversion and yield.

It has now been discovered, in accordance with this invention, that the difficulties incidental to the use of supported silver catalysts, both promoted and unpromoted, can be overcome by a novel reduction process in which a polyhydric alcohol compound is used both as a reductant and as an agent for promoting adhesion between the molecular silver and the support upon which it is deposited. The new process involves reduction at an elevated temperature of at least one reducible silver compound of the group including silver oxide, silver carbonate, and silver oxalate, hereinafter referred to as "silver compound" or "reducible silver compound," in the presence of a conventional particulate support by a polyhydric alcohol compound. By "polyhydric alcohol compound" is meant at least one member of the group including liquid glycols such as ethylene, propylene, and butylene glycols; glycerol; aqueous sugar solutions; aqueous polyvinyl alcohol solutions; polyglycols such as polyethylene and polypropylene glycols, including aqueous solutions of said polyglycols; water-soluble glycol alkyl ethers; water-soluble polyglycol alkyl ethers; and the like. The amount of polyhydric alcohol compound used ranges between that amount needed to form a monomolecular film on the silver compound particles, and promoter when added, as well as on the particles of the support or substrate, up to the amount which is absorbed and retained by them after gravity drainage, hereinafter to be designated as "amount sufficient to wet" or "polyhydric alcohol compound wetted" support, silver compound and promoter. The silver compound is reduced by the polyhydric alcohol compound and volatile products of reaction are evaporated upon being heated to a temperature ranging between 110° and 200° C. The heating is advantageously carried out in stages, e.g., from 110° to 140° C. to reduce the silver compound and from 140° to 200° C. to vaporize volatile products of reaction. Thereafter, the finished catalyst can be heat treated, as desired, to bring it to a desired level of activity, a known catalytic expedient, advantageously by heating at about 400° C. Another means of controlling the activity or selectivity of such supported silver catalysts is to incorporate one or more promoting agents, such as sodium oxide, barium oxide, gold chloride, stannous oxide, etc. Conventional catalyst supports or substrates such as fused alumina, zirconia, corundum, mullite and the like can be used. Alumina is preferred.

The process of this invention can be practiced in various ways, as follows. The silver compound and the particulate support can be mixed dry, and liquid or vaporized polyhydric alcohol compound introduced in amount sufficient to wet the solids while being mixed. Or the particulate support can be soaked in the polyhydric alcohol compound, allowed to drain somewhat, and then mixed with silver compound so that all the solids are wetted by the polyhydric alcohol compound. Again, a slurry of silver compound and polyhydric alcohol compound can be prepared in amount sufficient to wet the support, advantageously an absorptive support, which is then mixed into or dipped into the slurry, then gravity drained. In each case, the reaction mixture is thereafter heated, as indicated, to reduce the silver compound and to volatilize the vaporous reaction products. The proportion of silver compound to support is varied so as to deposit a burden of between 0.5 and 20 percent by weight of silver, finished catalyst basis. The preferred range for ethylene oxide production is between 6 and 12 percent of silver.

Reduction of the silver compound may be carried out in various ways, such as by heating the polyhydric alcohol compound wetted mass in an oven or with infrared lamps or in an open pan at temperatures between 110° and 140° C. for a time sufficient to reduce the silver compound. Thereafter the material is heated between 140° and 200° C. to remove volatiles, advantageously in an air-purged oven or by igniting the volatile reaction products when open pan heating is used. Such finished catalysts may be subjected to a subsequent heat treatment at 400° C. and above when it is desired to adjust catalyst activity.

The following examples represent specific embodiments of the invention.

EXAMPLE 1

A quantity of 15 mls. of diethylene glycol was added to 112 g. of granular alumina, U.S. Standard sieve mesh size 8 to 14. After the diethylene glycol had been fairly evenly distributed throughout the support, a quantity of 17.7 g. of silver oxalate was blended into the glycol-wet mass. The mixture was placed in an oven at 130° C. and heated for 2 hours. For the next 48 hours the mass was heated at 150° C. to dispel the diethylene glycol decomposition products. During the entire heating period, the oven was purged with a slow stream of air. The silver was firmly attached to the granules of the support in a fairly even distribution of very small particles of silver metal in the form of a mossy or particulate blanket.

A volume of 50 ml. of the catalyst so obtained was charged to a tubular reactor. A mixture of 3.2 percent of ethylene in air was passed through the catalyst, heated to about 250° C., at a space velocity of 560 volumes of feed gas, S.T.P., per volume of catalyst per hour. At a conversion of 50 percent of the ethylene, the ethylene oxide yield was 72 percent.

EXAMPLE 2

A quantity of 60 mls. of diethylene glycol was added to 448 g. of granular alumina, mesh size 8 to 14. After the glycol was distributed throughout the support, a quantity of 74 g. of silver oxalate was blended into the glycol-wet mass. The mass was heated at 120° C. for 2 hours, at 160° to 165° C. for 15 hours, then at 185° C. for 4 hours.

The catalyst so obtained was heated at 400° C. for 3 hours to adjust its activity, and was then tested as described in Example 1. A yield of 73 percent of ethylene oxide was obtained at 50 percent conversion of ethylene.

EXAMPLE 3

A quantity of 60 mls. of diethylene glycol was added to 214 g. of Alundum 38, 99.49 percent pure fused alumina having a bulk density of 116 lbs. per cubic foot. After the glycol was distributed throughout the granules of Alundum, a mixture of 16.1 g. of silver oxide and 1.35 g. of stannous oxide was blended into the mass. The glycol-wet mass was heated in an oven at 125° C. for two hours without air purge. The mass was then heated in an air-purged oven for a period of 15 hours at 175° to 180° C. The support used to prepare this catalyst was then fairly evenly covered with a mossy or particulate blanket of very small particles of silver metal which were firmly stuck to the support.

The catalyst thus obtained was heated at 400° C. to adjust its activity and tested as described in Example 1. At 50 percent conversion of the ethylene, the catalyst produced a yield of 73 percent of ethylene oxide.

EXAMPLE 4

A volume of 170 mls. of diethylene glycol containing 0.18 g. of gold chloride was added to 4686 g. of Alundum 38 fused alumina. After the glycol was well dispersed throughout the mass of support, a mixture of 352 g. of silver oxide and 28.6 g. of stannous oxide was blended into the glycol-wet support. The material was placed in an air-purged oven at 125° C. and the temperature was gradually increased to 175° to 180° C. and held there for 17 hours. The silver was firmly attached to the granules of the support in an even distribution of very small particles of silver metal in the form of a mossy or particulate blanket.

The catalyst so obtained was heated at 400° C. for 3 hours and tested as described in Example 1. At 50 percent conversion of the ethylene, the catalyst produced a yield of 71 percent of ethylene oxide.

EXAMPLE 5

A volume of 2.5 mls. of diethylene glycol containing 0.025 g. of gold chloride was added to 100 g. of Alundum 38 fused alumina and mixed until the glycol was distributed throughout the mass. A mixture of 75 g. of silver oxide and 0.6 g. of stannous oxide was blended into the glycol-wet support mass. The wet mass was placed about 9 inches below a 250 watt Sylvania reflector infra-red heat lamp and heated to a maximum of 180° C. over a period of 30 minutes. During the heating period, the mass was stirred to expose unreacted silver oxide to the heat rays of the lamp. At the end of 7 minutes, the silver oxide had changed to silver. The silver was firmly and evenly attached to the granules of the support as very finely divided particles of silver metal.

The catalyst thus obtained was heated at 400° C. in a muffle furnace for 3 hours and tested as described in Example 1. At 50 percent conversion of the ethylene, the catalyst produced a yield of 70 percent of ethylene oxide.

EXAMPLE 6

A volume of 2.5 mls. of diethylene glycol containing 0.02 g. of gold chloride and a volume of 1.4 mls. of diethylene glycol containing 0.12 g. of sodium hydroxide were mixed with 100 g. of regular Alundum fused alumina granules (94.35 percent $Al_2O_3$) having a bulk density of 130 lbs. per cubic foot. A mixture of 7.5 g. of silver oxide and 1.25 g. of stannous oxide was blended into the mass of glycol-wet support. The wet mass was placed in a box made of heavy aluminum foil supported on a wire gauze placed on a 6 inch hot plate and heated up to 200° C. when the glycol decomposition products were ignited and allowed to burn as they were evolved from the catalyst being heated. Heating at 200° C. was continued for a period of 10 minutes. The granules of support were then fairly evenly covered with finely divided silver metal which was firmly attached in the form of a mossy or particulate blanket.

The catalyst so obtained was tested as described in Example 1. At 50 percent conversion of ethylene, it gave a yield of 66 percent of ethylene.

EXAMPLE 7

A series of supported catalysts was prepared by a process similar to that of Example 1, but formulated to contain 6.5 percent of silver, finished catalyst basis, from a silver oxide source, using diethylene glycol, aqueous sugar solution containing 30 percent by weight of sugar, and glycerol as the polyhydric alcohols. In addition, two controls were prepared, also formulated to contain 6.5 percent of silver. One of the controls used water as the wetting liquid. The other control used finely divided silver as the silver source. Each member of the series was otherwise subjected to the same procedural steps and handling. The catalysts and controls were subjected to a dropping test, to be described below, to measure the relative adhesion of the silver to the support. Composition of the catalysts and results of the relative adhesion test appear in the following table:

Table 1

RELATIVE ADHESION OF SILVER TO SUPPORT: DROP TEST

| Catalyst | Percent Ag removed | Source of Ag | Wetting liquid and Amount used in Raw Mix |
| --- | --- | --- | --- |
| Control 1 | 43.1 | Silver oxide | Water: retained after gravity drainage. |
| Control 2 | 38.1 | Finely divided silver. | Diethylene glycol: retained after gravity drainage. |
| 3 | 2.16 | Silver oxide | Do. |
| 4 | 15.8 | do | Diethylene glycol: twice that retained after gravity drainage. |
| 5 | 2.88 | do | 30 percent aqueous sugar solution: retained after gravity drainage. |
| 6 | 7.2 | do | Glycerol: retained after gravity drainage. |

The above table shows the surprising improvement obtainable when a polyhydric alcohol in amount sufficient to wet the solids is used together with a reducible silver compound, pursuant to the invention, as compared with the use of (a) twice the necessary amount of polyhydric alcohol as wetting liquid, (b) water as wetting liquid and (c) metallic silver.

The relative adhesion (drop) test was as follows:

A tube 8 in. in diameter and 6½ ft. long was made from heavy paper. This tube was mounted vertically on an 8 in. No. 20 U.S. Standard sieve supported on a catch pan. The catalysts to be tested were poured very slowly into the top end of the vertically supported paper tube and allowed to fall 6½ ft. onto the No. 20 sieve. The loose silver was collected in the catch pan and the silver-coated support granules remained on the sieve. These materials were weighed to determine the relative adhesion of silver to support.

What is claimed is:

1. A process for manufacturing a supported silver catalyst of the group consisting of promoted and unpromoted catalysts which consists in heating a polyhydric alcohol compound-wetted mixture consisting of a particulate inert support and at least one reducible solid silver compound of the group consisting of silver oxide, silver carbonate, silver oxalate and a combination thereof with a promoter to a reaction temperature between 110° C. and 200° C. for a time sufficient to reduce the silver compound to metallic silver and to vaporize volatile reaction products the metallic silver being in a mossy, particulate form and having improved adhesion to the support.

2. A process as claimed in claim 1 wherein the heating reaction is carried out in a plurality of steps, at temperatures between 110° and 140° C. to reduce the silver compound, and at temperatures between 140° and 200° C. to vaporize volatile reaction products.

3. Product of the process of claim 1.

4. A process for manufacturing a supported silver catalyst which comprises heating a diethylene glycol-wetted mixture comprising a particulate inert support and at least one reducible silver compound of the group consisting of silver oxide, silver carbonate and silver oxalate to a reaction temperature between 110° C. and 200° C. for a time sufficient to reduce the silver compound to metallic silver and to vaporize volatile reaction products.

5. A process for manufacturing a supported silver catalyst which comprises heating a diethylene glycol-wetted mixture comprising a particulate inert support and at least one reducible silver compound of the group consisting of silver oxide, silver carbonate and silver oxalate to a reaction temperature between 110° and 200° C. for a time sufficient to reduce the silver compound to metallic silver and to vaporize volatile reaction products, wherein the proportion of silver compound is sufficient to provide a silver burden ranging between 0.5 and 20 percent by weight, finished catalyst basis.

6. A process for manufacturing a supported silver catalyst which comprises heating a diethylene glycol-wetted mixture comprising a particulate inert support and at least one reducible silver compound of the group consisting of silver oxide, silver carbonate and silver oxalate to a reaction temperature between 110° and 200° C. for a time sufficient to reduce the silver compound to metallic silver and to vaporize volatile reaction products, wherein the proportion of silver compound is sufficient to provide a silver burden ranging between 0.5 and 20 percent by weight, finished catalyst basis, and wherein the support is alumina.

References Cited in the file of this patent

UNITED STATES PATENTS

| | | |
|---|---|---|
| 2,307,421 | Overhoff | Jan. 5, 1943 |
| 2,404,438 | Evans | July 23, 1946 |
| 2,424,083 | Finch et al. | July 15, 1947 |
| 2,690,433 | Engel et al. | Sept. 28, 1954 |

UNITED STATES PATENT OFFICE
CERTIFICATE OF CORRECTION

Patent No. 2,920,052                                                                              January 5, 1960

George R. Martin

It is hereby certified that error appears in the printed specification of the above numbered patent requiring correction and that the said Letters Patent should read as corrected below.

Column 1, line 53, for "said" read -- solid --; column 3, line 9, for "A quantity of 60" read -- A volume of 5.2 --.

Signed and sealed this 4th day of October 1960.

(SEAL)

Attest:

KARL H. AXLINE
Attesting Officer

ROBERT C. WATSON
Commissioner of Patents